US012676764B1

(12) United States Patent
Prasad et al.

(10) Patent No.: US 12,676,764 B1
(45) Date of Patent: Jul. 7, 2026

(54) SYSTEMS AND METHODS FOR UTILIZING BLOCKCHAIN NETWORKS FOR NATURAL DISASTER EXTERNAL REPORTING

(71) Applicant: UIPCO, LLC, San Antonio, TX (US)

(72) Inventors: Bharat Prasad, San Antonio, TX (US); Kyle William Bocci, Tampa, FL (US); Jeffrey Brennan Quinn, San Antonio, TX (US); Diana Magdalena Bustos, San Antonio, TX (US); Craig Edward Mills, Schertz, TX (US); Swapan Chattopadhyay, Howell, NJ (US)

(73) Assignee: United Services Automobile Association (USAA), San Antonio, TX (US)

( * ) Notice: Subject to any disclaimer, the term of this patent is extended or adjusted under 35 U.S.C. 154(b) by 134 days.

(21) Appl. No.: 18/435,681

(22) Filed: Feb. 7, 2024

Related U.S. Application Data

(60) Provisional application No. 63/483,682, filed on Feb. 7, 2023.

(51) Int. Cl.
| | |
|---|---|
| *H04L 9/32* | (2006.01) |
| *G06Q 50/26* | (2024.01) |
| *H04L 9/00* | (2022.01) |

(52) U.S. Cl.
CPC ............. *H04L 9/50* (2022.05); *G06Q 50/265* (2013.01); *H04L 9/32* (2013.01)

(58) Field of Classification Search
CPC ........... H04L 9/50; H04L 9/32; G06Q 50/265
See application file for complete search history.

(56) References Cited

U.S. PATENT DOCUMENTS

| | | | | |
|---|---|---|---|---|
| 8,786,458 | B1 * | 7/2014 | Wiltzius | G08B 27/005 |
| | | | | 340/691.6 |
| 11,281,215 | B2 * | 3/2022 | Yoshizaki | G05D 1/0088 |
| 11,836,216 | B1 * | 12/2023 | Mcintyre | G06N 3/045 |
| 11,971,874 | B2 * | 4/2024 | Padmanabhan | H04L 67/10 |
| 12,086,110 | B1 * | 9/2024 | Desai | H04L 9/3239 |
| 12,244,515 | B1 * | 3/2025 | De Castro Marchese | |
| | | | | H04L 41/16 |
| 2017/0059343 | A1 * | 3/2017 | Spinelli | G01C 21/20 |
| 2018/0074887 | A1 * | 3/2018 | Braham | G06F 11/0709 |
| 2020/0364187 | A1 * | 11/2020 | Tran | G06N 3/02 |
| 2021/0013737 | A1 * | 1/2021 | Wu | H02H 7/263 |
| 2021/0216890 | A1 * | 7/2021 | Hulugundi | G06N 20/00 |
| 2021/0326989 | A1 * | 10/2021 | Whitaker | G06Q 40/08 |

* cited by examiner

*Primary Examiner* — Lynn D Feild
*Assistant Examiner* — Vladimir I Gavrilenko
(74) *Attorney, Agent, or Firm* — Fletcher Yoder P.C.

(57) ABSTRACT
The embodiments described herein relate to systems and methods for utilizing blockchain networks for natural disaster external reporting. For example, a blockchain network includes a blockchain configured to store information related to a potential natural disaster, wherein the blockchain includes a number of roles that are authorized to submit information to the blockchain, to receive information from the blockchain, or a combination thereof. Additionally, the information stored within the blockchain is suitably correlated to provide actionable intelligence to at least one government agency managing the potential natural disaster.

20 Claims, 4 Drawing Sheets

84

86

RECEIVING, VIA A NATURAL DISASTER DATA PROCESSING SYSTEM, INFORMATION RELATING TO A POTENTIAL NATURAL DISASTER FROM ONE OR MORE COMPUTING DEVICES ASSOCIATED WITH RESPECTIVE USERS

88

STORING, VIA THE NATURAL DISASTER DATA PROCESSING SYSTEM, AT LEAST A PORTION OF THE INFORMATION IN A BLOCKCHAIN NETWORK

90

PROVIDING, VIA THE NATURAL DISASTER DATA PROCESSING SYSTEM, ACCESS TO RESPECTIVE SUBSETS OF THE INFORMATION TO A PLURALITY OF USERS BASED AT LEAST IN PART ON RESPECTIVE ROLES OF THE USERS

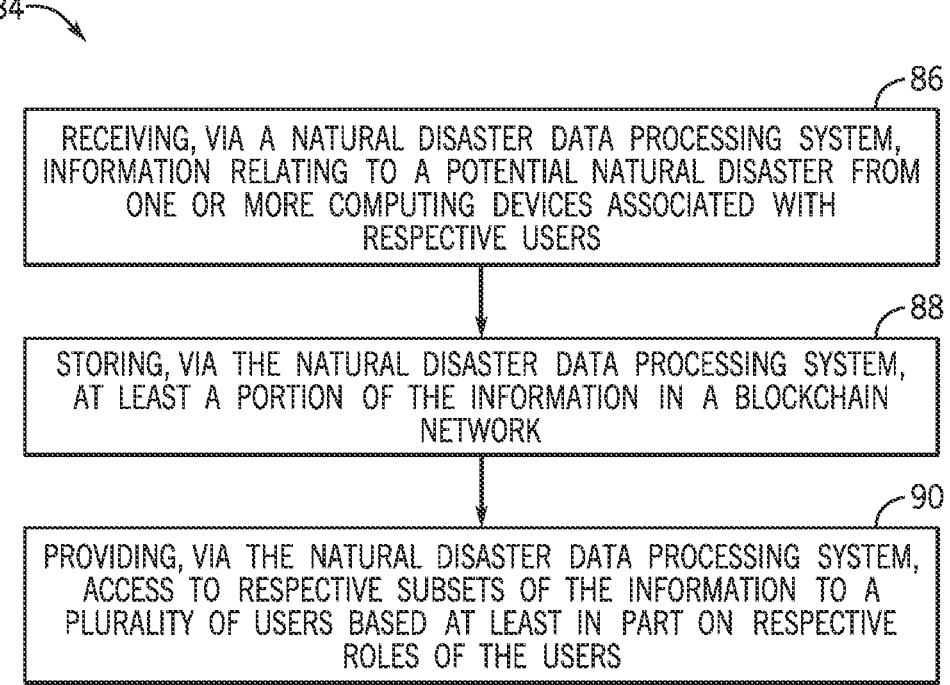

FIG. 4

SYSTEMS AND METHODS FOR UTILIZING BLOCKCHAIN NETWORKS FOR NATURAL DISASTER EXTERNAL REPORTING

CROSS-REFERENCE TO RELATED APPLICATION

The present patent application claims priority to and the benefit of U.S. Provisional Patent Application No. 63/483,682, entitled "SYSTEMS AND METHODS FOR UTILIZING BLOCKCHAIN NETWORKS FOR NATURAL DISASTER EXTERNAL REPORTING" and filed on Feb. 7, 2023, the disclosure of which is incorporated by reference herein in its entirety for all purposes.

BACKGROUND

The present disclosure relates generally to systems and methods for utilizing blockchain networks for natural disaster external reporting.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Natural disasters create informational challenges for various entities. In particular, in advance of a natural disaster, a government agency may desire to stage various resources (e.g., utility repair crews, search and rescue crews) to prepare for the natural disaster. During the natural disaster, the government agency may desire to track the deployment and operation of these resources. After the natural disaster, the government agency may desire information regarding the locations and extent of the damage to various properties, as well as information related to insurance coverage of these properties. At each of these stages, the inability of the government agency to obtain actionable intelligence prevents the agency from being able to effectively stage and deploy resources to deal with the natural disaster, which can result in delays in getting resources to those affected by the natural disaster. Additionally, other parties involved in the natural disaster, such as citizens, homeowners, emergency responders, utility services and crews, and so forth, may struggle to obtain actionable intelligence before, during, and after the natural disaster occurs.

BRIEF DESCRIPTION OF THE DRAWINGS

Various aspects of this disclosure may be better understood upon reading the following detailed description and upon reference to the drawings in which:

FIG. 4 is a block diagram of a method for utilizing the natural disaster data processing system, in accordance with embodiments described herein.

DETAILED DESCRIPTION

Figure 1:
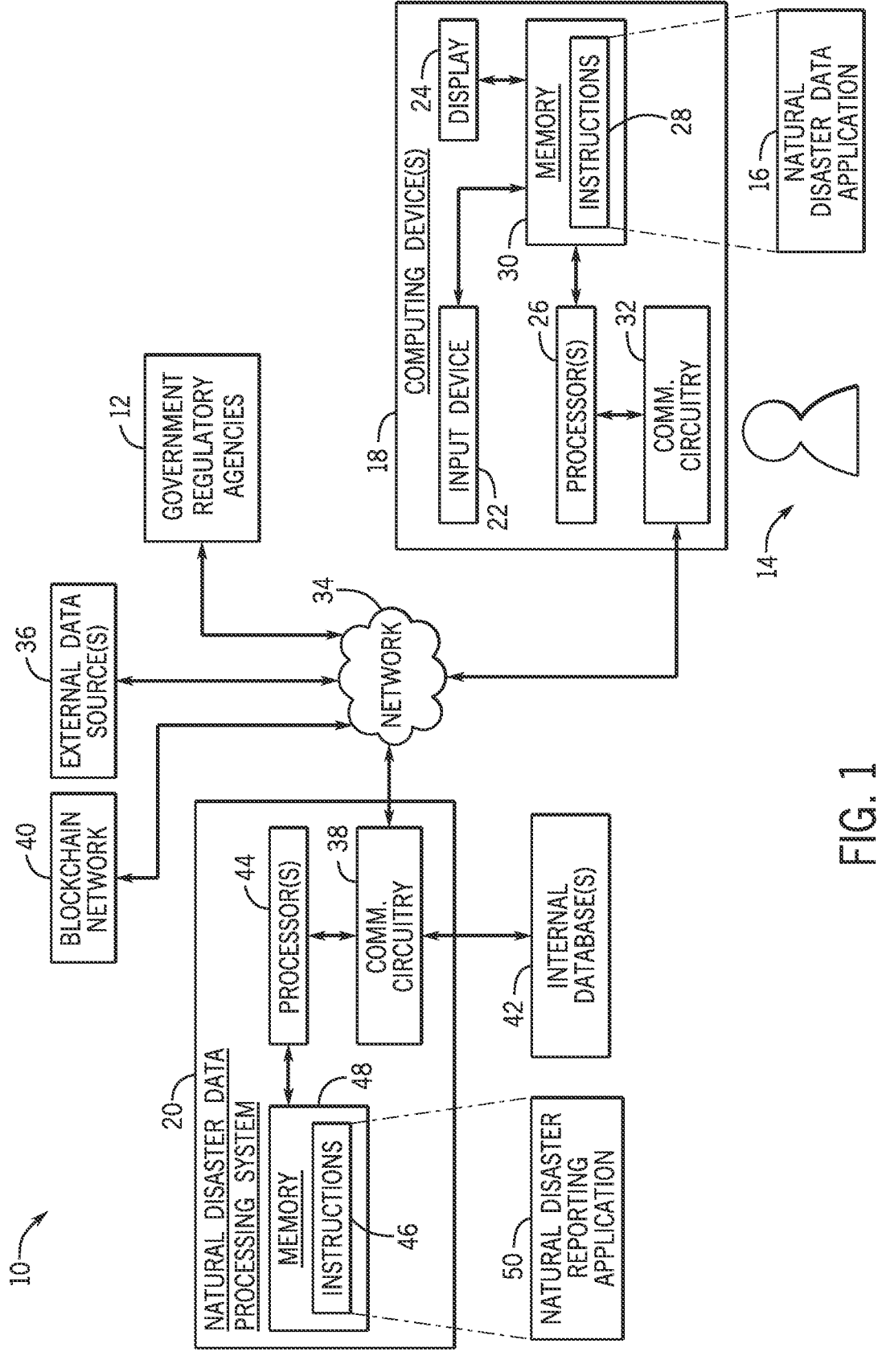
FIG. 1 is a schematic diagram of a natural disaster reporting system configured to enable natural disaster reporting to various government regulatory agencies using a blockchain network, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

In the following description, for the purposes of explanation, numerous specific details are set forth in order to provide a thorough understanding of embodiments of the present disclosure. It will be apparent, however, to one skilled in the art that embodiments of the present disclosure may be practiced without some of these specific details.

As used herein, the term "application" refers to one or more computing modules, programs, processes, workloads, threads, and/or computing instructions executed by a computing system. Example embodiments of an application include software modules, software objects, software instances, and/or other types of executable code.

As used herein, terms "continuous" and "continuously" may refer to ongoing (e.g., iterative) actions that are performed without interruption or are performed with interruptions that take no longer than a relatively short period of time, such as no longer than a 5-second interruption between the ongoing actions, no longer than a 1-second interruption between the ongoing actions, and so forth. For example, continuous ongoing actions may be performed in an iterative manner such that there is no appreciable (e.g., human-perceivable) interruption of the iterative actions.

As used herein, the terms "automatic" and "automatically" refer to actions that are performed by a computing device or computing system (e.g., of one or more computing devices) without human intervention. For example, automatically performed functions may be performed by computing devices or systems based solely on data stored on and/or received by the computing devices or systems despite the fact that no human users have prompted the computing devices or systems to perform such functions. As but one non-limiting example, the computing devices or systems may make decisions and/or initiate other functions based solely on the decisions made by the computing devices or systems, regardless of any other inputs relating to the decisions. In addition, as used herein, the term "autonomous" and "autonomously" refers to functions that are performed by computing devices or systems solely based on the functionality programmed into the computing devices or systems, for example, without requiring human intervention and/or input from external sources, such as external data sources.

The present disclosure relates generally to systems and methods for enabling management of data relating to natural disasters by, for example, storing the data in blockchain networks to enable external reporting to government (e.g., federal and/or state) regulatory agencies. With this in mind, FIG. 1 is a schematic diagram of an example embodiment of a natural disaster reporting system 10 configured to enable natural disaster reporting to various government regulatory agencies 12. For example, various users 14 may transmit data relating to natural disasters via natural disaster data applications 16 executable via computing devices 18 used by the users 14. In certain embodiments, the computing devices 18 may include any computing devices 18 configured to execute the natural disaster data applications 16 including, but not limited to, smart phones, computing tablets, personal computers (PCs), laptop computers, wearable computing devices, and so forth. In addition, the natural disaster data applications 16 may enable users 14 to interact with a natural disaster data processing system 20, as described in detail herein. In certain embodiments, each computing device 18 may be registered with the government regulatory agencies 12 by, for example, registering the computing device 18 (e.g., using a universally unique identifier (UUID), media access control (MAC) address, and so forth) with a user account (e.g., using a unique user identification number) associated with a particular user 14. Therefore, interaction with the natural disaster data application 16 by a particular user 14 via a particular computing device 18 may be automatically associated with that user 14. As described in greater detail herein, such association of users 14 with particular computing devices 18 may enable the identification of specific roles held by the users 14, which enables more accurate reporting of information relating to natural disasters.

In certain embodiments, manipulation of one or more input devices 22 (e.g., keyboards, mice, buttons, touch screens, and so forth) of the computing devices 18 may enable the users 14 to interact with the natural disaster data application 16, which may be displayed on one or more displays 24 (e.g., light emitting diode (LED) displays, organic LED (OLED) displays, and so forth) of the computing devices 18.

As illustrated in FIG. 1, in certain embodiments, the computing devices 18 may also include processing circuitry such as one or more processors 26 configured to execute instructions 28 stored in memory media 30 of the respective computing device 18, wherein the instructions 28, when executed by the one or more processors 26, enable the respective computing device 18 to collect data relating to a natural disaster from a user 14 using the respective computing device 18, as described in greater detail herein.

In certain embodiments, the one or more processors 26 of the computing devices 18 may be any suitable type of computer processors or microprocessors capable of executing computer-executable code. In certain embodiments, the memory media 30 of the computing devices 18 may be any suitable articles of manufacture that can serve as media to store processor-executable code, data, or the like. These articles of manufacture may represent computer-readable media (e.g., any suitable form of memory or storage) that may store processor-executable code (e.g., the instructions 28) executed by the one or more processors 26 to perform the presently disclosed techniques. In certain embodiments, the memory media 30 of the computing devices 18 may represent tangible, non-transitory computer-readable media (e.g., any suitable form of memory or storage) that may store the processor-executable code used by the one or more processors 26 to perform various techniques described herein. It should be noted that non-transitory merely indicates that the media is tangible and not a signal. It should be noted that the components described above with regard to the computing devices 18 are merely provided as example components, and the computing devices 18 may include additional or fewer components in certain embodiments.

In addition, in certain embodiments, the computing devices 18 may also include communication circuitry 32 configured to facilitate communication between the respective computing device 18 and the natural disaster data processing system 20 to facilitate the provision of natural disaster-related data to various government regulatory agencies 12, as described in greater detail herein. In certain embodiments, the communication circuitry 32 may facilitate communications using Wi-Fi, near field communication, Bluetooth, Zigbee, radio frequency identification (RFID) tags and/or readers, an embedded wireless module, and/or another suitable wired or wireless communication network 34.

In addition, in certain embodiments, as described in greater detail herein, external data sources 36 may be used to collect data relating to natural disasters that may be used by the natural disaster data processing system 20 to supplement the natural disaster-related data entered by users 14 via the natural disaster data application 16 or other applications. In certain embodiments, the external data sources 36 may include, but are not limited to, news-related data sources, weather-related data sources, and social media services. In certain embodiments, machine learning algorithms (e.g., artificial intelligence (AI) systems) may be trained and used to identify correlations between data entered by the users 14 and data received from the external data sources 36. For example, in certain embodiments, if data entered by the users 14 indicates that a natural disaster may be occurring in a particular geographical locations, the location-specific data received from the external data sources 36 may be analyzed by the machine learning algorithms to ascertain whether there is a correlation between the two sources of data. As will be appreciated, in such embodiments, the machine learning algorithms may be trained over time to determine when correlations with specific types of data from the two sources exist. As but one non-limiting example, if data entered by users 14 suggest that a potential hurricane is being predicted by the users 14 in a particular location, certain current weather-related data (e.g., wind speed, atmospheric pressure, precipitation, and so forth) in that particular location may be analyzed by the machine learning algorithms to determine when correlations are likely.

In certain embodiments, the natural disaster data processing system 20 may include communication circuitry 38 configured to facilitate communication between the natural disaster data processing system 20 and the computing devices 18, the government regulatory agencies 12, external data sources 36, a blockchain network 40, and one or more internal databases 42, as described in greater detail herein. In certain embodiments, the communication circuitry 38 may facilitate communications using Wi-Fi, near field communication, Bluetooth, Zigbee, radio frequency identification (RFID) tags and/or readers, an embedded wireless module, and/or another suitable wired or wireless communication network 34.

As illustrated in FIG. 1, in certain embodiments, the natural disaster data processing system 20 may include other processing circuitry such as one or more processors 44 configured to execute instructions 46 stored in memory media 48 of the natural disaster data processing system 20, wherein the instructions 46, when executed by the one or more processors 44, enable the natural disaster data processing system 20 to perform the functions described in greater detail herein. For example, in certain embodiments, the natural disaster data processing system 20 may be accessed by a natural disaster reporting application 50 to enable users 14 to report natural disaster-related data stored in the blockchain network 40 (and, in certain embodiments, one or more internal databases 42) to various government regulatory agencies 12, as described herein. In certain embodiments, the one or more processors 44 of the natural disaster data processing system 20 may be any suitable type of computer processors or microprocessors capable of executing computer-executable code. In certain embodiments, the memory media 48 of the natural disaster data processing system 20 may be any suitable articles of manufacture that can serve as media to store processor-executable code, data, or the like. These articles of manufacture may represent computer-readable media (e.g., any suitable form of memory or storage) that may store processor-executable code (e.g., the instructions 46) executed by the one or more processors 44 to perform the presently disclosed techniques. In certain embodiments, the memory media 48 of the natural disaster data processing system 20 may represent tangible, non-transitory computer-readable media (e.g., any suitable form of memory or storage) that may store the processor-executable code used by the one or more processors 44 to perform various techniques described herein. It should be noted that non-transitory merely indicates that the media is tangible and not a signal. It should be noted that the components described above with regard to the natural disaster data processing system 20 are exemplary components, and the natural disaster data processing system 20 may include additional or fewer components in certain embodiments.

Figure 2:
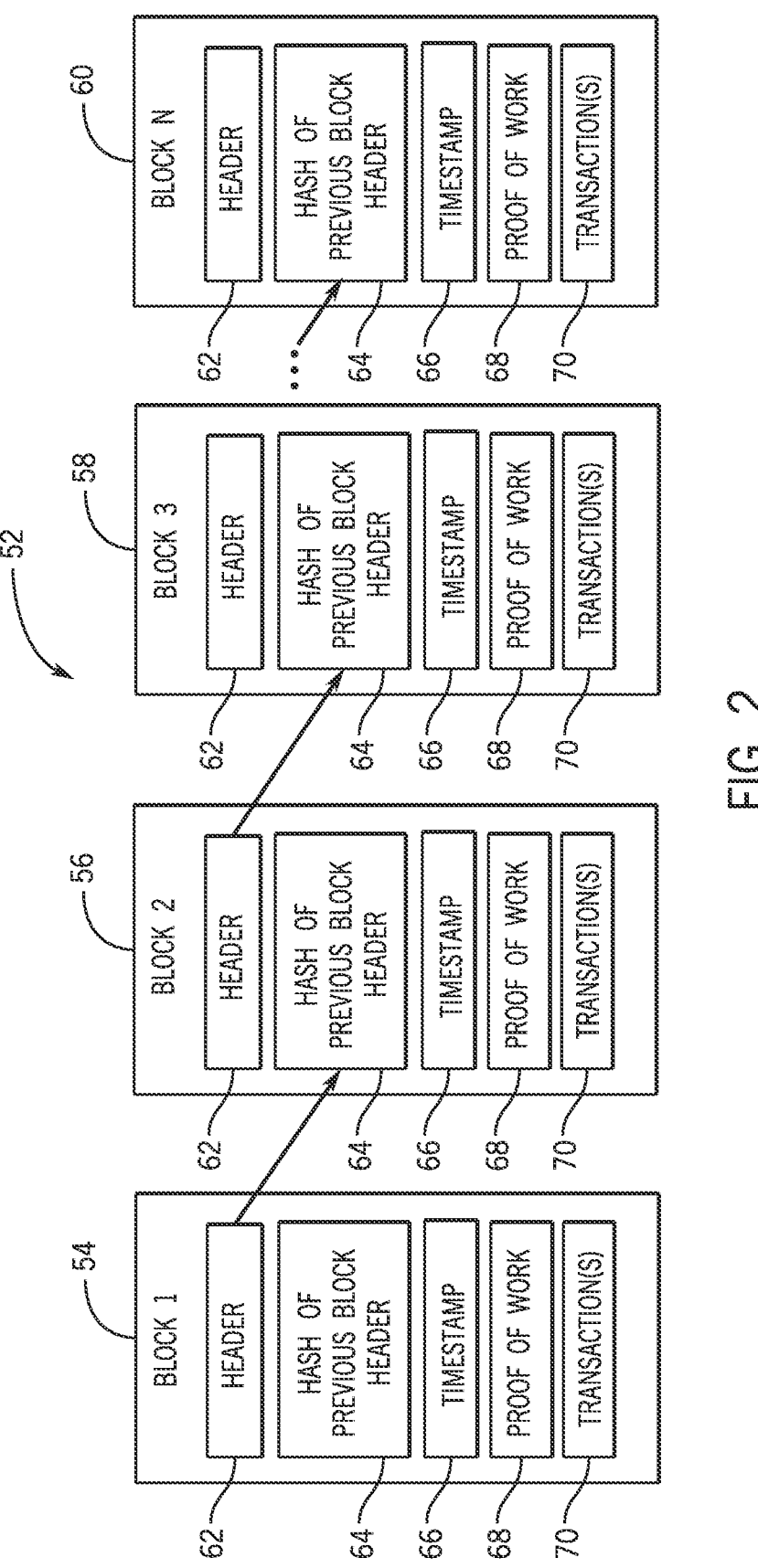
FIG. 2 illustrates a block diagram of a blockchain of a blockchain network of FIG. 1, in accordance with embodiments described herein.

As described herein, any and all of the data received, generated, and/or transmitted by the natural disaster data processing system 20 described herein may be stored by the natural disaster data processing system 20 in a distributed ledger, such as a blockchain network 40 and/or one or more internal databases 42. FIG. 2 illustrates a block diagram of a blockchain 52 of the blockchain network 40 of FIG. 1. In the illustrated embodiment, the blockchain 52 is illustrated as having multiple blocks 54, 56, 58, and 60. The block 54 (first block in the blockchain 52) may have been created and allocated as a special starting block. The block 54 may include a unique header 62 uniquely identifying the block 54 from other blocks in the blockchain 52. Because the block 54 is the first block in the blockchain 52, a hash of a previous block header 62 may be set to zero. A timestamp 66 may include the date of creation for the block 54, and a proof of work section 68 may include certain "work" that proves that a "miner" (or a consensus algorithm) has performed work suitable for the creation of the block 54 and/or to verify transactions in the blockchain 52. The work section 68 may vary based on a protocol used to create the blockchain 52. For example, a bitcoin protocol may use a Merkle tree. The Merkle tree may be a tree data structure in which every leaf node is labelled with a hash (e.g., one-way hash) of a data block, and every non-leaf node is labelled with a cryptographic hash of the labels of its child nodes. Because of the one-way transformation used in hashing, the Merkle tree has the property that there is no known technique that a deceptive party could use to guess a value that would hash with a second-to-last value to create the Merkle root, which is know from a verified blockchain 52, and so on, down the tree. In other words, there is no way to create a fake value that would hash to an expected Merkle tree value (e.g., value stored in work section 68 of the block 54), thus creating a single value that proves the integrity of all of the transactions under it. Transactions, such as transactions relating to interaction with the government regulatory agencies 12 described herein, may be stored in a transactions section 70. Data related to the particular transaction may also be stored in section 70 (or in another section).

When a new block is created, the block will receive a new header 62 uniquely identifying the new block. As described in herein, a peer-to-peer network may include multiple "miners" that add blocks to the blockchain 52 based on the blockchain protocol. In general, multiple miners validate transactions 70 that are to be added to a block, and compete (e.g., perform computing work, as introduced above) to have their respective block added to the blockchain 52. Validation of transactions includes verifying digital signatures associated with respective transactions 70. For a block to be added to the blockchain 52, a miner must demonstrate a proof of work before their proposed block of transactions is accepted by the peer-to-peer network, and before the block is added to the blockchain 52. In certain embodiments, a blockchain protocol includes a proof of work scheme (e.g., Merkle Tree) that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. As noted, the hash value is a one-way hash value such that the output hash value cannot be "unhashed" to determine what the input was. In certain embodiments, the blockchain protocol may require multiple pieces of information as input to the CHF. For example, the input to the CHF may include a reference to the previous (most recent) block (e.g., hash 64) in the blockchain 52, details of the transaction(s) 70 that are to be included in the to-be-created block, and a "nonce" value (e.g., a random number used only once).

Multiple nodes may compete to hash a set of transactions, and to provide the next block that is to be added to the blockchain 52. In certain embodiments, the blockchain protocol may provide a threshold hash to qualify a block to be added to the blockchain 52. For example, the threshold hash may include a predefined number of zeros (0s) that the hash value must have at the beginning (e.g., at least the first four characters of the hash value must each be zero). The higher the number of zeros, the more computationally time-consuming it may be to arrive at a qualifying hash value.

In accordance with the blockchain protocol, each miner in a peer-to-peer network receives transaction information for one or more transactions that are to be included in a block that is to be added next in the blockchain 52. Each miner provides the reference to the previous (most recent) block in the blockchain 52, details of the transaction(s) 70 that are to be included in the to-be-created block, and the nonce value to the CHF that may then be used to provide a hash value. If the hash value does not meet the threshold hash (e.g., the first four characters of the hash value are not each zero), the miner starts again to provide another hash value, thus increasing the amount of work. Alternatively, if the hash value meets the threshold hash (e.g., at least the first four characters of the hash value are each zero), the respective miner may have successfully created the next block that is to be added to the blockchain 52. Consequently, the respective miner's block is broadcast across the peer-to-peer network. At this point, all other miners cease work (because one miner was already successful), and all copies of the blockchain 52 are updated across the peer-to-peer network to append the block to the blockchain 52. Each miner may produce hundreds of thousands (or more) of hash values, before any one miner provides a qualifying hash value (e.g., at least the first four characters of the hash value are each zero).

In certain embodiments, at least a portion of the data may be stored in one or more internal databases 42, instead of storing all of the data on the blockchain network 40. Such data may be referred to as off-chain data where the actual has derived from such data elements may be stored or transacted on the blockchain network 40 itself, although some of the data elements may be stored in the one or more internal databases 42, as opposed to be stored on the blockchain network 40. For example, data elements A, B, and C could be stored in an off-chain internal database 42, but the hash of A+B+C may be sent to a smart contract on the blockchain network 40. Such implementations may ensure that the blockchain network 40 does not become storage for large amounts of data, but still enables enhanced auditability, is tamper-proof, and so forth.

It is to be noted that any computing device 18 may be miners. Accordingly, for example, as new data is created, new blocks may be added to the blockchain 52, including blocks 54, 56, 58, and 60. Indeed, the blockchain 52 may continue to grow, storing new data as it becomes available. Because of the distributed nature of the peer-to-peer network created via the blockchain network 40, each node may include copies of the blockchain 52 and share copies of the blockchain 52 as new peers enter the peer-to-peer network. Each copy of the blockchain 52 may include verified information for all or substantially all of the data tracked by the blockchain network 40. The information is secure, immutable, and more efficiently tracked as new information is added via the blockchain network 40.

Figure 3:
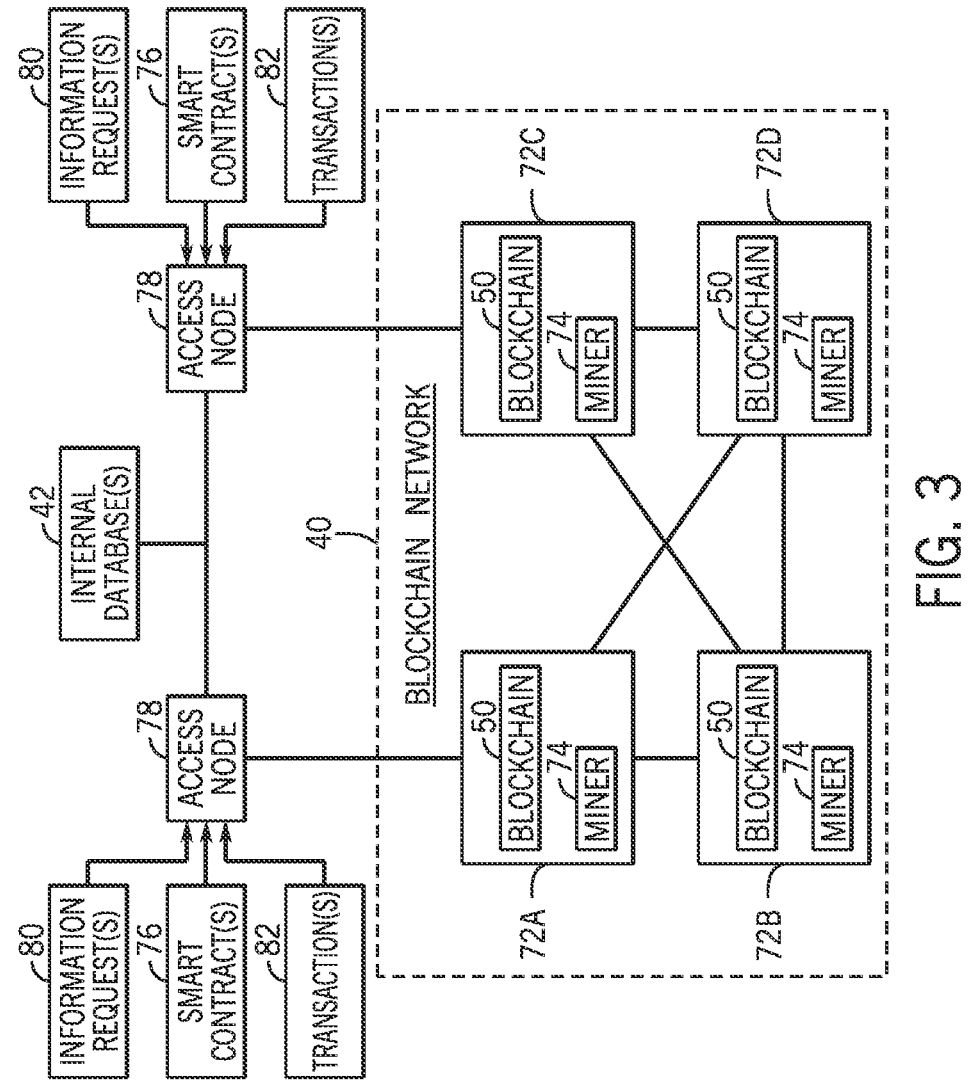
FIG. 3 illustrates a portion of the natural disaster reporting system of FIG. 1, which may be used to manage data relating to natural disaster-related data using a distributed ledger (e.g., blockchain network), in accordance with embodiments described herein.

FIG. 3 illustrates a portion of the natural disaster reporting system 10 of FIG. 1, which may be used to manage data relating to natural disaster-related data using a distributed ledger (e.g., blockchain network) 40, in accordance with embodiments described herein. As described herein, the blockchain network 40 may be formed by several blockchain nodes, such as blockchain nodes 72A, 72B, 72C, and 72D, which may be implemented by a dedicated server or computer device, or may be implemented as a virtual machine in a shared computer system. Each blockchain node 72A-D may have in its memory a replicate of the blockchain 52. Each blockchain node 72A-D may also have a miner 74, an application that may verify the integrity of the blockchain 52, and may also perform operations and/or transactions using smart contracts 76 associated with the blockchain 52. As described herein, the blockchain 52 is a replicated data structure that may have its consistency and integrity preserved by a consensus mechanism performed by the miners 74.

Users 14 may interact with the blockchain network 40 via an access node 78. For example, users 14 may request, through the access node 78, the recordation and/or processing of data (e.g., using a smart contract 76), such as an information request 80 (e.g., a request for the state of a smart contract 76), or a transaction request 82 (e.g., a request for a change in a state of the smart contract 76) to the blockchain 52. The smart contracts 76, information requests 80, and/or transaction requests 82 allow users 14 to record certain natural disaster-related data, as described herein. Each access node 78 may be implemented by a computer terminal coupled to the blockchain network 40 and, in certain embodiments, one or more internal databases 42.

A miner 74 from any of the blockchain nodes 72A, 72B, 72C, and 72D may create an update to the blockchain 52. In certain embodiments, the smart contract(s) 76 may be a data structure that may include states (e.g., internal states) and transaction instructions relating to the data stored in the blockchain 52. The transactions, or functions, may include instructions that modify the states of the smart contracts 76 and/or interact with other smart contracts 76 by performing further transactions. Examples of smart contracts 76 described herein include smart contracts 76 related to storing natural disaster-related data, as described herein. Following insertion of a smart contract 76, the blockchain node 72 may propagate its update of the blockchain 52, and the other blockchain nodes 72 may accept the update using a consensus mechanism (e.g., proof of work, proof of stake, and so forth). For example, if blockchain node 72A generated a blockchain segment that incorporates some smart contract 76 to the blockchain 52, blockchain node 72A may propagate the updated blockchain 52 to blockchain nodes 72B, 72C, and 72D, which may validate and accept the updated blockchain 52.

Similarly, a transaction request 82 may be received by any miner 74 of the blockchain nodes 72A, 72B, 72C, and 72D via an access node 78. The transaction request 82 may perform operations that cause a change in the state of a smart contract 76 recorded in the blockchain 52. After performing the desired operations, and changing the state of the smart contract 76, in accordance with the transaction request 82, the miner 74 may update the blockchain 52 to record the updated state of the smart contract 76. The updated state of the smart contract 76 may be propagated to the blockchain nodes 72A-D, verified, and persisted using consensus mechanisms. An information request 80, similar to a transaction request 82, may be received by a miner 74, which may perform operations associated with a smart contract 76. However, in contrast with the transaction request 82, the information request 80 does not lead to changes in the state of the smart contract 76 and, thus, updates to the blockchain 52 that result from a successful information request 80 are not performed.

In certain embodiments, performance of the operations by the miners 74 of the blockchain nodes 72 may be incentivized and/or regulated by exchange of tokens (e.g., currencies) of the blockchain 52. For example, in public blockchains, updates to the blockchain 52 by a blockchain node 72A-D may be rewarded with a blockchain token. Moreover, performance of a transaction request 82 or an information request 80 may be rewarded with a blockchain token. For example, in certain embodiments, in the Ethereum public blockchain, updates to the blockchain from recordation of smart contracts 76 and information requests 80 may be rewarded with Ether tokens, and performance of transaction requests 82 and information requests 80 may be incentivized by offers of Ethers in the form of a secondary token called "gas". In certain private blockchain embodiments, tokens may be used to implement prioritization mechanisms for the operations and/or to prevent large or faulty operations from blocking the blockchain 52 with arbitrarily long operation times.

Although described primarily as being implemented via public blockchains where proof of work/mining is a primary manner of obtaining consensus, in other embodiments, private and permissioned blockchains may also be used, where consensus may be achieve by other means without the need for mining. In such embodiments, the private and permissioned blockchains may be accessible by invited participants on a closed blockchain network, and consensus may be achieved by any suitable consensus algorithm(s) such as practical Byzantine Fault Tolerance (pBFT). It will be appreciated that, in such embodiments, the miners 74 illustrated in FIG. 3 may be omitted.

In addition, as described above, in certain embodiments, at least a portion of the data relating to natural disasters may be stored in one or more internal databases 42 instead of in a blockchain network 40. For example, certain data relating to the natural disasters may include data that is not intended to be accessible by government regulatory agencies 12 but, rather, is intended as more proprietary data that is, for example, usable only by a particular insurance company as data relating to parties insured by the insurance company, for example. As such, in certain embodiments, the natural disaster data processing system 20 may be configured to filter (and/or encrypt) data stored in the blockchain network 40 and/or the internal databases 42 based on identification of a user 14 attempting to access the data (e.g., based on a particular role of a particular user 14). In such embodiments, certain metadata (e.g., access level, access type, and so forth) may be associated with particular types of data to ensure that the more proprietary data is not unintentionally exposed to third parties.

As described above, the embodiments described herein enable management of data relating to natural disasters by, for example, storing the data in blockchain networks to enable external reporting to government (e.g., federal and/or state) regulatory agencies. In the event of a natural disaster, such as a hurricane, earthquake, or forest fire, government agencies need certain information in order to provide their intended functions, such as declaring a state of disaster/emergency, declaring an evacuation order, allocating resources for infrastructure repair, allocating emergency search and rescue resources, allocating funds for repair of public and private properties, and so forth. Certain information can be obtained before or after the occurrence of a natural disaster, such as information relating to public and private structures in an affected region (e.g., location, size, elevation, type, state of repair, insurance coverage, insurance coverage density), the locations of utility infrastructure in the affected region (e.g., power lines, communication lines, gas lines, storm drainage), maps (e.g., topography maps, utility maps, zip code maps, county or district maps), and so forth. Additionally, for certain types of natural disasters (e.g., hurricanes and forest fires), a predicted path may be determined in advance of the natural disaster reaching an affected area. During or after the natural disaster has occurred, the government agencies may seek additional information related to the natural disaster, such as information pertaining to damage to structures in the affected area (e.g., images/videos, affidavits, police reports, inspection reports, damage or repair estimates, repair documentation), information related to insurance claims filed for structures in the area (e.g., distributions, policy caps, policy limitations), information defining the actual path or affected area of the natural disaster (e.g., maps, charts, global positioning system (GPS) data sets).

However, while government agencies need the aforementioned information to effectively respond to a natural disaster, in the absence of the present techniques, there has been no efficient and secure way for this information to be collected and made available to government agencies coping with natural disasters. This can lead to delays and inefficiencies as agencies wait for sufficient information to take appropriate actions to address the natural disaster, as well as potential misallocation of resources (e.g., funds, emergency resources) when inappropriate actions are taken based on limited or insufficient information. Additionally, before, during, and after a natural disaster, government agencies may be inundated with information from disparate channels in a disorganized manner, while long hours and stress can allow certain information to be overlooked or misplaced. Furthermore, the people experiencing the natural disaster are often frustrated by an inability to gain up-to-date information that is specific to their location/region, such as updates regarding flood warnings, information regarding a declared state of emergency, the status of an insurance claim or governmental aid, and so forth.

At least a portion of the information that the government agencies seek in relation to a natural disaster is often collected or generated at insurance companies that offer coverage within the affected area. As such, government agencies often depend on insurance companies to provide a substantial amount of the information that the government agencies seek in relation to a natural disaster. However, there can be hundreds to thousands of insurance companies that offer different types coverage in the affected area, and each of these companies may collect or store this information in different ways (e.g., different details, file formats, different codes/abbreviations). This can result in the government agency being overloaded with unorganized and uncorrelated data, which can further delay the government agency in being able to discern actionable intelligence from the data to prioritize responses to address the natural disaster.

With the foregoing in mind, the present embodiments are directed to enabling management of information relating to natural disasters by, for example, storing the information in a blockchain network 40, or another suitable distributed ledger, to enable external reporting to government agencies and other relevant parties in a secure and effective manner. The blockchain network 40 is generally designed to receive and store information related to a natural disaster in a secure manner, and to enable government agencies the ability to efficiently access and retrieve this information as needed. For example, the information can be provided to the blockchain network 40 by a person or entity having property affected by the natural disaster, an insurance company offering coverage in the affected area, utility service and repair crews, robotic surveillance vehicles (e.g., drones), weather services, emergency services, and various government agencies. Both the submission of information to and the retrieval of information from the blockchain network 40 is controlled, for example, using smart contracts 76 (e.g., via interaction with the natural disaster data processing system 20). By controlling the in-flow and out-flow of information with respect to the blockchain network 40, these smart contracts 76 enable detailed audit trails that track each submission and modification, and ensures that the information from all of the various sources is properly secured and correlated (e.g., based on locations or structures, people or policy holders, submitter, time) within the blockchain network 40. In addition to government agencies, certain information stored within the blockchain network 40 may be made available in a controlled manner to enable benefits to other entities, including insurance companies, insurance policy holders, utility services, city planning services, and so forth.

As noted, one important aspect of the blockchain network 40 is the receipt and storage of information related to an area that has been or may be impacted by a natural disaster. In some embodiments, the blockchain network 40 may store information for a smaller regional area (e.g., a community, a district, a county), while in other embodiments, the block-chain network 40 may be expanded to store information regarding larger areas (e.g., states, multi-state regions, entire countries) that may be impacted by a natural disaster. In some embodiments, the blockchain network 40 may be created and populated well in advance of a threat of a natural disaster, while in other embodiments, the blockchain net-work 40 may be created in specific response to a particular natural disaster that has occurred or is predicted to occur. In certain embodiments, the administration and operation of the blockchain network 40 may be controlled by a decen-tralized autonomous organization (DAO), by an insurance company or consortium of insurance companies, or by a government agency. It may be appreciated that, since the blockchain network 40 is distributed, the blockchain net-work 40 is robust and remains accessible despite failures of individual computer systems, for example, as a result of the natural disaster (e.g., due to flooding or storm damage, due to power or utility outages).

Once created, the blockchain network 40 includes con-trols (e.g., associated smart contracts 76) having software instructions that, when executed by a processor, ensure that submitted data is properly processed and stored. In some embodiments, smart contracts 76 determine the identity of each user 14, whether the user 14 is submitter, a subscriber, or a combination thereof. For example, in an embodiment, submitters must be associated with a user account that is authorized to make submissions to the blockchain network 40, and each subscriber is associated with a user account that is authorized to retrieve or receive information from the blockchain network 40. Each user 14 of the blockchain network 40 may be provided with credentials (e.g., user-name, passwords, cryptographic certificates) during a reg-istration process, and the user 14 subsequently provides these credentials when authenticating to access the block-chain network 40. A smart contract 76 associated with the blockchain network 40 may be configured to authenticate each user 14 based on information stored within the block-chain network 40 and/or information stored within a com-municatively coupled server (e.g., a secure database external to the blockchain network 40). In some embodiments, the smart contracts 76 are configured to enable users 14 to have different defined roles, which limits the types of information each user 14 is allowed to submit or receive.

As noted, a submitter is a user 14 of the blockchain network 40 that may be a person (e.g., an insurance policy holder, a person impacted by the natural disaster, a first responder, a utility worker), a company or entity (e.g., a utility company, an insurance company, a weather service), or a device (e.g., a robotic drone, a network attached weather or flooding sensor, a network attached seismometer). Each submitter 14 may be assigned a suitable role as part of the registration process, and may be afforded suitable creden-tials that enable the submitter 14 to authenticate with the blockchain network 40 (e.g., via the natural disaster data processing system 20) to make submissions. The identity of the submitter 14, as well as other data related to the submission (e.g., time/date of submission, internet protocol (IP) address, media access control address, suitable hash values), may be stored within the blockchain network 40 along with the submitted information for auditing purposes.

Information may be submitted to the blockchain network 40 in various forms. As such, in certain embodiments, the smart contracts 76 associated with the blockchain network

40 may pre-process submissions in different manners to extract useful information. For example, in certain embodi-ments, certain information may be submitted to the block-chain network 40 by providing an image (e.g., a scanned image or photograph) of a document (e.g., a title document, an insurance document, a repair estimate). In response, a smart contract 76 associated with the blockchain network 40 may pre-process the submitted image, for example, by performing optical character recognition (OCR) of the images to extract textual data, which may then further processed for storage by the blockchain network 40 (e.g., the images may be automatically processed to remove portions of the images that are not particularly relevant to the occurrence of a natural disaster). In another example, a submission from a robotic drone may include a video file from a fly-over of an area, and a smart contract 76 associated with the blockchain network 40 may pre-process this video, for example, to automatically extract shorter video seg-ments, still frames, or combinations thereof, that correspond to particular locations (e.g., particular addresses, particular GPS coordinates, particular neighborhoods) of the area. In certain embodiments, each of these types of filters (e.g., both image and video filtering) may be automatically performed with the aid of machine learning algorithms (e.g., artificial intelligence (AI) systems) that are trained over time (e.g., across several natural disaster events) to learn what portions of images and/or video are particularly relevant to the occurrence of natural disasters.

Certain information submitted to the blockchain network 40 is non-sensitive or public data. This may include, for example, information received from weather services, infor-mation regarding disaster declarations by government agen-cies, images collected by robotic drones before or after the natural disaster, and so forth. In general, this non-sensitive data may be added to the blockchain network 40 without security enhancement. However, it is also presently recog-nized that certain information (e.g., personally identifying information) submitted to the blockchain network 40 may have varying degrees of sensitivity. As such, in some embodiments, sensitive information submitted to the block-chain network 40 is suitably processed to enhance data security within the blockchain network 40. This may involve, for example, encoding or encrypting certain pieces of information and/or scrubbing or removing certain pieces of information from the submission prior to being stored. In certain embodiments, the submitted information may be at least partially processed on the computing device 18 of the submitter 14, such that certain pieces of information are either not provided to the blockchain network 40 for storage, or are only provided in an encrypted form. In some embodi-ments, certain piece of sensitive information may be stored separately from the blockchain network 40, such as in a communicatively coupled external database (e.g., a database of an insurance company), and the blockchain network 40 may include a reference (e.g., a hyperlink, a key value, a hash value) that points or refers to the information securely stored in the database. Accordingly, in such embodiments, a user 14 attempting to retrieve information from the external database may first provide the aforementioned credentials to be authenticated by the blockchain network 40 as having a suitable role within the blockchain network 40 to access the reference to the information, and then provide separate credentials to authenticate with the external database to retrieve the actual information.

Additionally, once the information has been pre-pro-cessed and/or processed for security, the submitted infor-mation is stored within the blockchain network 40 and correlated with other information in the blockchain network 40 in various manners. As a non-limiting list of examples, a submission may be correlated with other submissions based on one or more of: locations (e.g., submissions regarding the same location or structure, submissions from the same local region or zip code), type of structure (e.g., submissions related to similar commercial or residential structures), person (e.g., submissions by the same person, a relative, or an agent), insurance coverage (e.g., submissions related to the same insurance company or the same level of coverage), property values (e.g., submissions related to similarly valued properties or structures), level of damage (e.g., submissions with a similar level of loss or damage), time (e.g., submissions occurring within a predefined time window of one another), and/or another suitable relationship. It may be appreciated that each of the correlations can be used to retrieve information from the blockchain network 40. For example, a user 14 with a suitable role may be able to query the blockchain network 40 to determine all information related to a particular location or structure, all information related to structures having a similar property value in a given area, all information related to future flooding predictions for a given neighborhood, and so forth.

During data correlation, the smart contracts 76 associated with the blockchain network 40 may identify information in a submission that conflicts with other information in the blockchain network 40 and handle the conflict in different manners. For example, a user 14 may make a submission indicating that he has coverage by a first insurance company, while a submission from a second insurance company indicates that the user 14 has coverage from the second insurance company. In certain embodiments, one or more machine learning algorithms (e.g., artificial intelligence (AI) systems) may be configured and/or trained to identify and/or flag conflicts within the information stored by the blockchain network 40. In some cases, a conflict may be an indication of a submission error on the part of one or more submitters 14, stale or erroneous data that results from information that has changed since submission, or intentional fraud. In some embodiments, a particular role may be designated as the authority (e.g., deciding or controlling party) for certain submitted information, and the information provided or returned by the blockchain network 40 may specifically correspond to the information submitted by the designated authority. In some cases, the blockchain network 40 may provide information from the submission from the authority as being most likely to be correct, while still also providing and indicating any additional conflicting information stored in the blockchain network 40. In some cases, the blockchain network 40 may include roles that enable a particular user 14 (e.g., a government agent, an insurance company, a police detective) to specifically query conflicting information from the blockchain network 40 (e.g., with respect to a particular person or location) in order to investigate potential fraud related to the natural disaster.

In some embodiments, the role assigned to a user 14 may include certain submission and subscription rights, meaning that the user 14 has the ability to submit certain types of information to, and to receive or retrieve certain types of information from, the blockchain network 40. For example, as noted above, a user 14 may be a government agency or an agent of a government agency that is assigned a corresponding role in the blockchain network 40. In some embodiments, a government agency role may be authorized to submit certain information to the blockchain network 40, such as information related to disaster declarations, information related to evacuation orders, information related to government assistance programs or other governmental resources, contact information for emergency services, and so forth. In some embodiments, the government agency role may also subscribe to the blockchain network 40 to receive or retrieve certain information from the blockchain network 40. For example, a user 14 with a government agency role may provide one or more communication channels through which the user 14 desires to receive updates, and may subscribe to receive updated information submitted to the blockchain network 40 that is related to particular types of information (e.g., updates regarding utility repairs, updates regarding new weather or flooding forecasting), such that the user 14 receives updated information via the one or more communication channels as it is updated within the blockchain network 40. Additionally, a user 14 with the government agency role may also perform queries or run reports based on the correlated information stored by the blockchain network 40. For example, the user 14 may query the blockchain network 40 to generate maps that indicate insurance coverage density over at least a portion of the affected area (e.g., which policy holders have which types of insurance coverage in a given zip code), maps indicating property values of properties across at least a portion of the affected area, maps indicating the current deployment of resources (e.g., search and rescue crews, utility repair crews, survey drones) across at least a portion of the affected area, and so forth. As such, the blockchain network 40 enables government agencies to glean actionable intelligence for preparing for and responding to the natural disaster based on the correlated information stored by the blockchain network 40. Furthermore, one or more government agencies may query the correlated information stored in the blockchain network 40 to predict how resources (e.g., search and rescue crews, utility repair crews, survey drones, food/supplies) should be staged in advance of, or deployed in response to, the natural disaster or a subsequent natural disaster. In some embodiments, one or more government agencies may query the correlated information stored in the blockchain network 40 to enable enhanced city planning and permitting, for example, by indicating regions in which the utility system is already strained or prone to failure and/or by indicating regions that are prone to damage by natural disasters, which can be considered as part of a building permit approval process.

Other example roles within the blockchain network 40 relate to homeowners (or other types of property owners). For example, a person that is confirmed to be a homeowner in the affected area during a registration/verification process may be assigned a homeowner role that enables the user 14 to submit images of damage, information regarding the location and size of the property and structure, scans of documents (e.g., insurance policy information, repair bills, damage estimates, title documents, mortgage documents, appraisals, documents received from a government agency), and similar information. As noted, submissions by the homeowner may be suitably stored along with audit data (e.g., source IP, source MAC address, a hash based on the timestamp), which can be used to validate or verify that the homeowner has completed certain submissions at a designated time. In some embodiments, the homeowner role may enable the homeowner to retrieve or receive certain information from the blockchain network 40 that is related to his or her property (e.g., previous submissions by the user 14, before and after drone images, predicted/actual weather patterns, predicted/actual utility outages, predicted/actual flood measurements, announcements from a government agency). For example, in one embodiment, during or after registration, a homeowner may subscribe to various types of information on the blockchain network 40, such as weather information, government announcements, insurance claim information, damage surveys, and so forth, as well as provide one or more communication channels (e.g., email, phone number, online message service account) that can be used to reach the homeowner. Subsequently, when new submissions are added to the blockchain network 40 that corresponds to the address of the homeowner and the subscribed types of information, a smart contract 76 associated with the blockchain network 40 may contact the homeowner via the one or more communication channels to provide the homeowner with updated information (e.g., an updated flooding forecast). This enables the homeowner an information channel to receive updates related to the natural disaster that are specific to the address of the homeowner, which can be difficult information to obtain in the lead-up to, and in the wake of, a natural disaster.

Other example roles within the blockchain network 40 relate to insurance companies. For example, a user 14 may be assigned an insurance company or insurance agent role that enables the user 14 to submit and to subscribe to various types information within the blockchain network 40. In some embodiments, the insurance company role may enable the insurance company to submit certain information to the blockchain network 40, such as information related to the locations of properties insured by the company, the property values of properties insured by the company, terms or conditions of the insurance policies in the affected area, claims submitted, approved, and/or rejected by the insurance company, and so forth. In some embodiments, the insurance company role may enable the insurance company to subscribe to retrieve or receive certain information from the blockchain network 40 that is related people or property associated with the insurance company, such as insurance claims submitted by a policy holder, maps indicating coverage over at least a portion of the affected area, maps indicating regions of the affected area having the largest insurance claims, reports indicating time widows between policy start dates and earliest reports of damage, and so forth. In some cases, the insurance company may make future business decisions (e.g., whether or not to continue offering a type of policy or coverage in an area, whether to increase the rates associated with a policy in the area) based on the information stored within the blockchain network 40. In some embodiments, the insurance company may have a fleet of robotic drones disposed within the affected area, and the insurance company may deploy the fleet to collect images of insured properties in advance of, and in response to, the natural disaster. For such embodiments, the provisioning and deployment of these drones may be determined based on the aforementioned information stored within the blockchain network 40, and/or each of these drones may be registered as submitters 14 to directly submit the captured images to the blockchain network 40. It may be appreciated that the insurance company may provide other resources (e.g., insurance agents, funds, food/supplies) in advance of, or in response to, the natural disaster based on the information stored within the blockchain network 40.

Other example roles within the blockchain network 40 relate to utility services and utility workers. For example, a utility company may be assigned a suitable role within the blockchain network 40 to enable the utility company to submit information to the blockchain network 40 regarding current state of service, service outages, on-going utility repair work, expected delays in restoration of utility services, resources (e.g., number of utility workers or vehicles)

deployed to address a utility outage, and so forth, at various locations or over various regions within the affected area. In some embodiments, a utility worker may be assigned a suitable role within the blockchain network 40 to enable the utility worker to submit information related to a current location of the utility worker, a location of damage that resulted in a utility outage, an underlying cause of a utility outage, an expected repair duration of a utility repair, and so forth. In some embodiments, the role of the utility company may enable the utility company to subscribe to the information submitted to the blockchain network 40 by the utility workers, which is correlated, as discussed above, to enable the utility company to determine whether current utility repair resources are adequate, as well as whether these resources are currently being effectively deployed and utilized throughout the affected area to address utility outages. In another example, a cellular telephone utility service provider may have a fleet of robotic drones that are equipped to function as improvised cellular towers to provide limited service to the affected area, and each of the robotic drones may report their respective location to the blockchain network 40, such that the utility company can provision and track the deployment of these resources within the affected area. Additionally, in some embodiments, other entities may also subscribe to information submitted by utility services and/or workers. For example, a search and rescue crew may subscribe to this information to track the location of utility workers, and in the event that the location is at risk for additional natural disaster impact (e.g., a flooding risk), may rely on this information when evacuating these utility workers. It may be appreciated that this is especially useful in the wake of natural disasters in which utility crews from other regions travel to the affected area to assist local utility workers, and there may not be an established communication channel to enable these additional utility workers to be effectively managed and protected.

FIG. 4 is a block diagram of a method 84 for utilizing the natural disaster data processing system 20 (e.g., assisted by the blockchain network 40, the smart contracts 76, and so forth) described herein. As illustrated, in certain embodiments, the method 84 may include receiving, via the natural disaster data processing system, information relating to a potential natural disaster from one or more computing devices 18 associated with respective users 14 (block 86). In addition, in certain embodiments, the method 84 may include storing, via the natural disaster data processing system 20, at least a portion of the information in a blockchain network 40 (block 88). In addition, in certain embodiments, the method 84 may include providing, via the natural disaster data processing system 20, access to respective subsets of the information to a plurality of users 14 based at least in part on respective roles of the users 14 (block 90). In certain embodiments, the roles of the users 14 indicate the users as representatives of a government agency, representatives of an insurance company, representatives of a utility company, or property owners.

In addition, in certain embodiments, the method 84 may include providing, via the natural disaster data processing system 20, the access to the respective subsets of the information to the plurality of users 14 based at least in part on whether the information is marked as proprietary. In addition, in certain embodiments, the method 84 may include enabling, via the natural disaster data processing system 20, the plurality of users 14 to authenticate with the blockchain network 40 using at least one credential. In addition, in certain embodiments, the method 84 may include pre-processing, via the natural disaster data processing system 20, the received information prior to storing the received information in the blockchain network 40. In addition, in certain embodiments, the method 84 may include processing, via the natural disaster data processing system 20, the received information for security by removing a portion of the received information, encrypting the portion of the received information, storing the portion of the received information in a communicatively coupled external database, or any combination thereof. In addition, in certain embodiments, the method 84 may include correlating, via the natural disaster data processing system 20, the received information with information stored in the blockchain network 40 based on a location associated with the received information, a user 14 associated with the received information, an insurance coverage associated with the received information, a property associated with the received information, a level of damage associated with the received information, a timestamp associated with the received information, or some combination thereof.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims. It should be appreciated that any of the features and embodiments described herein may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112 (f). However, for any claims containing elements designated in any other manner, it is intended that such elements are not to be interpreted under 35 U.S.C. § 112 (f).

The invention claimed is:

1. A natural disaster reporting system, comprising:
a natural disaster data processing system configured to:
   receive information relating to a potential natural disaster from one or more computing devices associated with respective users of the natural disaster reporting system, wherein the information comprises one or more image files and/or one or more video files relating to the potential natural disaster;
   utilize machine learning algorithms to automatically perform image and/or video filtering of the one or more image files and/or the one or more video files to extract at least a portion of the information that is particularly relevant to the potential natural disaster;
   store the at least a portion of the information in a blockchain network; and
   provide access to respective subsets of the information to a plurality of users based on respective roles of the users in the natural disaster reporting system, wherein the respective roles of the users are assigned during a registration process with the natural disaster reporting system.
2. The natural disaster reporting system of claim 1, wherein the roles of the users indicate the users as representatives of a government agency, representatives of an insurance company, representatives of a utility company, or property owners.

3. The natural disaster reporting system of claim 1, wherein the natural disaster data processing system is configured to provide the access to the respective subsets of the information to the plurality of users based at least in part on whether the information is marked as proprietary.

4. The natural disaster reporting system of claim 1, wherein the natural disaster data processing system is configured to enable the plurality of users to authenticate with the blockchain network using at least one credential.

5. The natural disaster reporting system of claim 1, wherein the natural disaster data processing system is configured to pre-process the received information prior to storing the received information in the blockchain network.

6. The natural disaster reporting system of claim 1, wherein the natural disaster data processing system is configured to process the received information for security by removing a portion of the received information, encrypting the portion of the received information, storing the portion of the received information in a communicatively coupled external database, or any combination thereof.

7. The natural disaster reporting system of claim 1, wherein the natural disaster data processing system is configured to correlate the received information with information stored in the blockchain network based on a location associated with the received information, a user associated with the received information, an insurance coverage associated with the received information, a property associated with the received information, a level of damage associated with the received information, a timestamp associated with the received information, or some combination thereof.

8. The natural disaster reporting system of claim 1, wherein the natural disaster data processing system is configured to provide actionable intelligence to at least one government agency managing the potential natural disaster.

9. The natural disaster reporting system of claim 1, wherein the respective roles of the users are assigned to the users from a plurality of roles during the registration process with the natural disaster reporting system.

10. The natural disaster reporting system of claim 9, wherein the plurality of roles comprises a government agency role.

11. The natural disaster reporting system of claim 9, wherein the plurality of roles comprises a homeowner role.

12. The natural disaster reporting system of claim 9, wherein the plurality of roles comprises an insurance company role.

13. The natural disaster reporting system of claim 9, wherein the plurality of roles comprises a utility company role.

14. A method, comprising:
   receiving, via a natural disaster data processing system, information relating to a potential natural disaster from one or more computing devices associated with respective users of the natural disaster data processing system, wherein the information comprises one or more image files and/or one or more video files relating to the potential natural disaster;
   utilizing, via the natural disaster data processing system, machine learning algorithms to automatically perform image and/or video filtering of the one or more image files and/or the one or more video files to extract at least a portion of the information that is particularly relevant to the potential natural disaster;

storing, via the natural disaster data processing system, the at least a portion of the information in a blockchain network; and providing, via the natural disaster data processing system, access to respective subsets of the information to a plurality of users based at least in part on respective roles of the users in the natural disaster data processing system, wherein the respective roles of the users are assigned during a registration process with the natural disaster data processing system.

15. The method of claim 14, wherein the roles of the users indicate the users as representatives of a government agency, representatives of an insurance company, representatives of a utility company, or property owners.

16. The method of claim 14, comprising providing, via the natural disaster data processing system, the access to the respective subsets of the information to the plurality of users based at least in part on whether the information is marked as proprietary.

17. The method of claim 14, comprising enabling, via the natural disaster data processing system, the plurality of users to authenticate with the blockchain network using at least one credential.

18. The method of claim 14, comprising pre-processing, via the natural disaster data processing system, the received information prior to storing the received information in the blockchain network.

19. The method of claim 14, comprising processing, via the natural disaster data processing system, the received information for security by removing a portion of the received information, encrypting the portion of the received information, storing the portion of the received information in a communicatively coupled external database, or any combination thereof.

20. The method of claim 14, comprising correlating, via the natural disaster data processing system, the received information with information stored in the blockchain network based on a location associated with the received information, a user associated with the received information, an insurance coverage associated with the received information, a property associated with the received information, a level of damage associated with the received information, a timestamp associated with the received information, or some combination thereof.

* * * * *